Patented Feb. 7, 1950

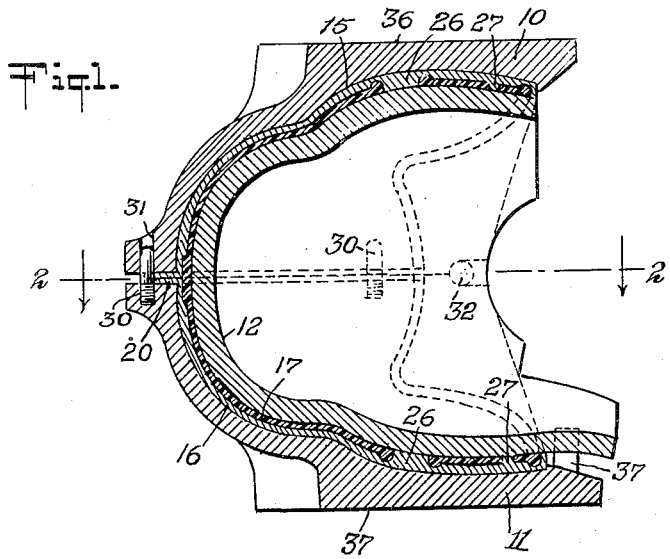
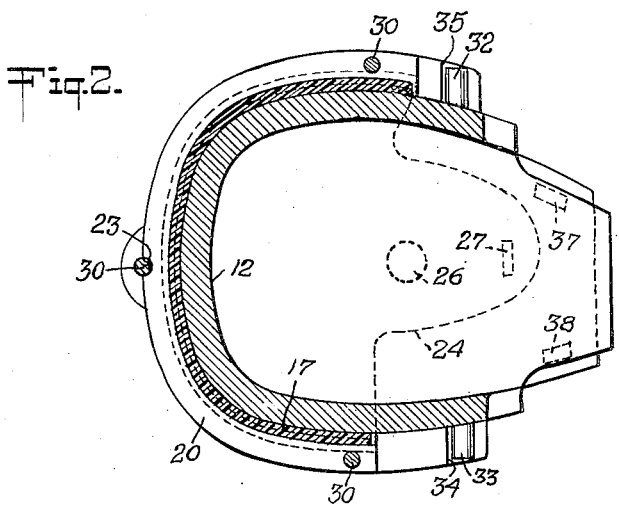
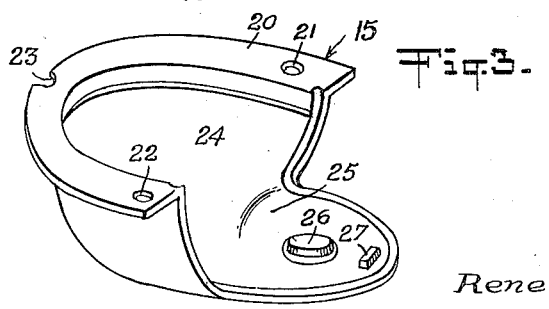

2,497,009

UNITED STATES PATENT OFFICE 2,497,009

METHOD OF MOLDING

Rene Minuto, New York, N. Y.

Application August 21, 1948, Serial No. 45,485

3 Claims. (Cl. 18—55)

This invention relates to a method for molding articles of thermoplastic, thermosetting or resinous material and more particularly to the use of a series of thin inexpensive shells of sheet or cast material, use of which eliminates the use of a heated die or dies. In ordinary use the molding of articles of thermoplastic, thermosetting or resinous material requires considerable heating and pressure applied to the dies and after the pressure has been applied it has heretofore been necessary to cool the die or dies before removing the molded article therefrom. Otherwise, the molded article would adhere to the die and not only spoil the molded article but require a cleaning of the dies. It has therefore been customary to chill the die before removing the molded article. This necessarily entails a considerable amount of time and obviously limits the productivity of each die. Where mass production was desired a series of dies had to be used, each of them involving substantial pressure in tons, some dies developing up to thousands of tons of pressure. The cost of such dies is considerable and they must be used many times over before the capital investment is realized. Moreover, in dies of the character described it is very difficult to form undercut surfaces or certain shapes, since in a mass production die only simple forms can be produced.

An object of this invention is to provide a simple relatively inexpensive method of molding in which various shapes and forms can be produced without the capital investment required for the dies heretofore described.

A further object is to provide a method of molding in which substantially less pressure is required and in which the molded object need stay in the press for only a few seconds, thus making it possible to use a single press for a great many operations in a relatively short period of time.

A still further object is to provide a method of molding in which the press need not be heated nor chilled, thus eliminating the costly waste of heat in the usual process.

A still further object is to provide a method wherein various gases and vapors developed in the setting and curing of a material to be molded may be released, thus providing a molded article of greater flexibility and finer finish.

Basically, my process is carried out by providing a plurality of shells formed to conform with the object to be molded. This may be done by shaping a sheet of lead or other pliable material over the object to be reproduced and then having cast a series of sheets for use in a single press. It will be understood, of course, that this requires a male and one or more female elements. A series of such elements may be made for use in a single press, the material to be molded to be placed in one or more of the shells and heated in an oven to the required temperature to place the particular material in a plastic or setting stage. The sheets are then assembled and placed in a press where they are pressed into the proper form. The unit is then removed and allowed to cool, while another such unit makes use of the press.

While the process will necessarily differ depending upon the shape of the final article to be molded, I will describe my process as applied to the molding of a football helmet, it being distinctly understood that this is purely a single illustration which is used merely to show the operation and the possibility of forming undercut surfaces using my method. Other objects, such as toilet seats or any other molded object, may be made by varying the parent mold and the mold liners to suit the finished object, an essential feature of my invention being provision of a method whereby with a series of liners and a single mold and a single press many operations may be completed in the time previously required where the mold had to be heated and cooled before the operation was complete.

In the accompanying drawings—

Fig. 1 is an elevation in cross-section of a mold and liner showing the operation of my method.

Fig. 2 is a cross-sectional view taken on the line 2—2 of Fig. 1.

Fig. 3 is a perspective view of one of the female members forming the mold lining.

In the drawings, 10 and 11 indicate sections of the outer mold; 12 indicates the inner mold section; 15 indicates one of the female sections of the liner, while 16 indicates the corresponding section, each of which is identical with that shown in Fig. 3. The material being molded is indicated by the numeral 17.

In preparing the shell 15 the impression is taken as heretofore described with pliable material of the model of the article to be molded, including any indentations or openings therein. In the present case the shell is made in two parts, 15 and 16, each having a flange 20, having side register holes 21 and 22 and a rear or top indentation 23. These shells are preferably made of a material to withstand heat such as bronze or brass and may be plated to give them a smoother inner surface 24. In the case of the helmet, an indentation is noted at 25 to cover the ear portion of the helmet and lugs 26 and 27 to provide openings for hearing in the case of 26 and for the helmet strap in the case of 27. Pre-castings are then made including the outer castings 10 and 11 and the inner casting 12. The outer castings 10 and 11 are provided with register pins 30 with corresponding registering holes 31 while the inner mold member 12 is provided with register pins 32 and 33 adapted to engage register holes 34 and 35 in the outer mold member. The outer mold member is provided with surfaces 36 and 37 to engage the upper and lower part of a press. Pins 37 and 38 are provided in 11 to insure registration of lower outer mold 11 and inner mold 12.

In operation a suitable amount of material to be molded in crystal or powder form is placed within the shell 15 and a similar amount within the corresponding shell 16. A series of these shells may be placed in the oven at one time and be subjected to temperature until the particular material is in a thermosetting or plastic state. Shells 15 and 16 are then placed within their respective molding members 10 and 11 and the inner molding member 12 inserted so that the register pins 33 engage the hole 34 and the pin 38 is in register. The mold is then brought together with the various pins 30 engaging the corresponding register holes and the pin 32 engaging the opening 35 and the entire mold subjected to pressure for a few seconds. A very limited amount of time is required since the various gases formed upon the curing and preparation of the resin or plastic being molded are allowed to escape in the furnace or oven and after a few seconds of relatively light pressure the mold is opened, the inner mold member removed and the shell unit removed from the mold and allowed to cool and set. A new shell member may be immediately inserted from the oven and the process repeated. Since the outer mold members 10 and 11 are not subjected to constant heating and cooling to an appreciable degree they may be cast of cheaper materials than in the present day molds and the expensive die cutting and tool work is thereby eliminated. Since all of the undercuts and indentations are under separable shells the assembling of the mold and the separation thereof are relatively simple matters.

It will be understood that while my detailed description has been directed to a specific object, namely, a football player's helmet, that this is used purely for the purpose of illustration and that I do not wish to limit the use of my method to any specific item.

Having described my invention, I claim:

1. A method of molding an article of material which initially becomes plastic by heat which consists in placing the material to be molded in a pair of shells, each of which is of a character to mold one-half of the article, heating said shells and said materials in a furnace until sufficiently plastic to be molded, placing said shells and a corresponding inner shell in a separable mold, subjecting said mold to pressure and then removing said shell from said mold whereby said mold is ready for another set of shells and allowing the first mentioned set of shells to thoroughly cool.

2. A method of molding an article which initially becomes plastic by heat and which would tend to stick to the mold while hot, which consists of heating the material to be molded in a removable, smooth metal shell of a size and shape to mold one side of the object to be molded, placing said shell in an unheated outer mold having a conforming inner member, placing said mold in a press and applying pressure for a limited period of time and then removing said shell with said molded article, whereby successive shells may be used to repeat the process.

3. A method of molding an article of material which initially becomes plastic by heat which consists in placing said material in a smooth metal shell of a size and shape to mold one side of the object to be molded, heating said shell and said material in a furnace until the material is sufficiently plastic to be molded, placing said shell in an unheated outer mold having a conforming inner member, placing said mold in a press and applying pressure for a limited time and then removing said shell with said molded article.

RENE MINUTO.

REFERENCES CITED

The following references are of record in the file of this patent:

UNITED STATES PATENTS

| Number | Name | Date |
| --- | --- | --- |
| Re. 13,988 | Eggers | Sept. 28, 1915 |
| 1,735,668 | Benge et al. | Nov. 12, 1929 |